US011297115B2

(12) United States Patent
Govindarajan et al.

(10) Patent No.: US 11,297,115 B2
(45) Date of Patent: *Apr. 5, 2022

(54) RELAYING MEDIA CONTENT VIA A RELAY SERVER SYSTEM WITHOUT DECRYPTION

(71) Applicant: Sling Media Pvt. Ltd., Bangalore (IN)

(72) Inventors: Jagan Govindarajan, Karnataka (IN); Gopikumar Ranganathan, Karnataka (IN); Jayachandrakumar Konduru, Karnataka (IN)

(73) Assignee: Sling Media Pvt. Ltd., Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,767

(22) Filed: Jul. 13, 2020

(65) Prior Publication Data

US 2020/0344280 A1 Oct. 29, 2020

Related U.S. Application Data

(63) Continuation of application No. 15/907,463, filed on Feb. 28, 2018, now Pat. No. 10,742,696.

(51) Int. Cl.
*G06F 15/16* (2006.01)
*H04L 65/61* (2022.01)
(Continued)

(52) U.S. Cl.
CPC .......... *H04L 65/4069* (2013.01); *H04L 9/065* (2013.01); *H04L 9/3265* (2013.01);
(Continued)

(58) Field of Classification Search
CPC ............. H04L 63/0272; H04L 12/4641; H04L 65/4084; H04L 65/60
(Continued)

(56) References Cited

U.S. PATENT DOCUMENTS 7,441,270 B1 10/2008 Edwards et al.
7,647,614 B2 1/2010 Krikorian et al.
(Continued)

FOREIGN PATENT DOCUMENTS

WO 03/081460 A1 10/2003
WO 2010/002761 A1 1/2010

OTHER PUBLICATIONS

International Search Report and Written Opinion for PCT/IN2019/050118 dated Apr. 3, 2019, all pages.
(Continued)

*Primary Examiner* — Wing F Chan
*Assistant Examiner* — Andrew Woo
(74) *Attorney, Agent, or Firm* — Kilpatrick Townsend & Stockton LLP

(57) ABSTRACT

Various arrangements are presented for relaying a secure streaming media communication session. A media relay server system may receive from a streaming media client via the Internet a first request for the secure streaming media communication session. A secure streaming media communication session may be established between a private streaming media server and the media relay server system. The media relay server system may establish a Transmission Control Protocol (TCP) communication service between the media relay server system and the private streaming media server via the Internet. The media relay server system may route, via the Internet, encrypted media packets from the private streaming media server to the streaming media client without the encrypted media packets being decrypted by the media relay server system.

20 Claims, 5 Drawing Sheets

(51) Int. Cl.

| | |
|---|---|
| *H04L 69/16* | (2022.01) |
| *H04L 67/02* | (2022.01) |
| *H04L 67/01* | (2022.01) |
| *H04L 9/32* | (2006.01) |
| *H04N 21/2347* | (2011.01) |
| *H04L 9/06* | (2006.01) |
| *H04L 29/06* | (2006.01) |
| *H04L 65/1069* | (2022.01) |
| *H04N 21/4408* | (2011.01) |
| *H04N 21/4405* | (2011.01) |
| *H04N 21/63* | (2011.01) |
| *H04L 67/025* | (2022.01) |
| *H04N 7/173* | (2011.01) |
| *H04N 21/4788* | (2011.01) |
| *H04L 61/4511* | (2022.01) |

(52) U.S. Cl.
CPC ...... *H04L 61/1511* (2013.01); *H04L 63/0428* (2013.01); *H04L 63/0457* (2013.01); *H04L 63/102* (2013.01); *H04L 65/1069* (2013.01); *H04L 67/02* (2013.01); *H04L 67/025* (2013.01); *H04L 67/42* (2013.01); *H04L 69/16* (2013.01); *H04N 7/17318* (2013.01); *H04N 21/2347* (2013.01); *H04N 21/4405* (2013.01); *H04N 21/4408* (2013.01); *H04N 21/4788* (2013.01); *H04N 21/632* (2013.01); *H04L 63/168* (2013.01)

(58) Field of Classification Search
USPC .................................................. 709/217, 219
See application file for complete search history.

(56) References Cited

U.S. PATENT DOCUMENTS

| | | | |
|---|---|---|---|
| 7,995,756 B1 | 8/2011 | McKinney et al. | |
| 9,436,773 B2 | 9/2016 | Milstead | |
| 9,819,648 B1 | 11/2017 | Chilakapati et al. | |
| 2003/0088767 A1 | 5/2003 | Emerson, III | |
| 2003/0126252 A1 | 7/2003 | Abir | |
| 2003/0131353 A1 | 7/2003 | Blom et al. | |
| 2004/0162787 A1 | 8/2004 | Madison et al. | |
| 2004/0254887 A1 | 12/2004 | Jacoby | |
| 2005/0021467 A1 | 1/2005 | Franzdonk | |
| 2006/0095472 A1 | 5/2006 | Krikorian et al. | |
| 2007/0217407 A1* | 9/2007 | Yuan | H04L 61/2528 370/389 |
| 2007/0239886 A1 | 10/2007 | Montemayor et al. | |
| 2010/0005483 A1* | 1/2010 | Rao | H04N 21/4331 725/25 |
| 2010/0036969 A1 | 2/2010 | Perry et al. | |
| 2010/0125626 A1 | 5/2010 | Lucas et al. | |
| 2012/0170741 A1 | 7/2012 | Chen et al. | |
| 2013/0046864 A1 | 2/2013 | Behringer et al. | |
| 2013/0250358 A1 | 9/2013 | Suzuki | |
| 2016/0323260 A1 | 11/2016 | Francois et al. | |
| 2017/0250797 A1 | 8/2017 | Goldstein | |
| 2019/0268389 A1 | 8/2019 | Govindarajan et al. | |

OTHER PUBLICATIONS

International Search Report and Written Opinion for PCT/IN2019/ 0850117 dated May 7, 2019, all pages.

Nakamura Keio Univ / Wide Project H Hazeyama Naist / Wide Project Y Ueno Keio Univ / Wide Project A Kato Keio Univ / Wide Project O: "A Special Purpose TLD to resolve IPv4 Address Literal on DNS64/NAT64 environments: draft-osamu-v6ops-ipv4-literal-in-url-02.txt," A Special Purpose TLD to Resolve IPV4 Address Literal on DNS64/NAT64 Environments: Draft-Osamu-V6OPS-IPV4-Literal-In-URL-02.txt. Internet Engineering Task Force, IETF; Standardworkingdraft, Internet Society (ISOC) 4, Rue Des Falaises CH—1205 Geneva, Oct. 27, 2014, pp. 1-15. XP015102819 [retrieved on Oct. 27, 2014].

* cited by examiner

RELAYING MEDIA CONTENT VIA A RELAY SERVER SYSTEM WITHOUT DECRYPTION

CROSS-REFERENCES TO RELATED APPLICATIONS

This Application is a continuation application of U.S. patent application Ser. No. 15/907,463, filed on Feb. 28, 2018, entitled "Relaying Media Content Via A Relay Server System Without Decryption," the disclosure of which is hereby incorporated by reference in its entirety for all purposes. U.S. patent application Ser. No. 15/907,463 is also related to U.S. patent application Ser. No. 15/907,796, filed on Feb. 28, 2018, entitled "Methods and Systems for Secure DNS Routing," the disclosure of which is hereby incorporated by reference in its entirety for all purposes.

BACKGROUND

Network-enabled devices that allow for the recording and storage of media are becoming commonplace. Such devices allow for the streaming or transmission of media across the Internet for playback at a remote network-enabled playback device. Transmission of such media across the Internet may be desired to be performed in an encrypted form, such as to help prevent acquisition by an unauthorized party. However, such encryption may present various challenges, such as how to efficiently implement such encryption, avoid increased latency in transmission of the media, reduce design complexity, and reduce implementation complexity.

SUMMARY

Various embodiments are described related to relaying a secure streaming media communication session. In some embodiments, a method for relaying a secure streaming media communication session is described. The method may include receiving, by a media relay server system from a streaming media client via the Internet, a first request for the secure streaming media communication session linked with a particular user account. The method may include establishing, by the media relay server system via the Internet, in response to the request for the secure streaming media communication session, the secure streaming media communication session between a private streaming media server via a previously-established outbound session initiated by the private streaming media server and the media relay server system. The private streaming media server may record and store media for retrieval for the particular user account. The private streaming media server and the media relay server system may have a same first and second level domain. The method may include establishing, by the media relay server system, a Transmission Control Protocol (TCP) communication service between the media relay server system and the private streaming media server via the Internet. The method may include mapping, by the media relay server system, the streaming media client to the private streaming media server. The method may include routing, by the media relay server system via the Internet, encrypted media packets from the private streaming media server to the streaming media client without the encrypted media packets being decrypted by the media relay server system.

Embodiments of such a method may include one or more of the following features: The first request for the secure streaming media communication session may request a Hypertext Transfer Protocol Secure (HTTPS) communication service. The encrypted media packets may be routed from the private streaming media server to the streaming media client as part of the HTTPS communication service. Mapping the streaming media client to the private streaming media server may include assigning a first port to the streaming media client. Mapping the streaming media client to the private streaming media server may include assigning a second port to the private streaming media server. Mapping the streaming media client to the private streaming media server may include mapping, at the media relay server system, the first port to the second port such that data packets received on the second port may be retransmitted to the streaming media client. The streaming media client and the private streaming media server may be owned and operated by a same user linked with the particular user account. The private streaming media server may reside within a first private network and the streaming media client may reside within a second private network distinct from the first private network. Routing the encrypted media packets from the private streaming media server to the streaming media client may include receiving, by the media relay server system from the private streaming media server via the Internet, a plurality of encrypted streaming media packets that may indicate a port of the media relay server system. Routing the encrypted media packets from the private streaming media server to the streaming media client may include determining, by the media relay server system, that the plurality of encrypted streaming media packets may be mapped to the streaming media client at least partially based on the indicated port. Routing the encrypted media packets from the private streaming media server to the streaming media client may include transmitting, by the media relay server system, the plurality of encrypted streaming media packets to the streaming media client. The media relay server system may not have decrypted any of the plurality of encrypted streaming media packets. The method may include establishing, by the media relay server system, a resource name for the private streaming media server that includes at least the same first level domain and second level domain as the resource name of the media relay server system. The encrypted media packets may include video and audio data.

In some embodiments, a system for relaying a secure streaming media communication session is described. The system may include a private streaming media server. The private streaming media server may record and store media for retrieval for a particular user account. The private streaming media server and a media relay server system may have a same first and second level domain. The system may include the media relay server system that communicates with the private streaming media server via the Internet. The media relay server system may include one or more processors. The media relay server system may include a memory communicatively coupled with and readable by the one or more processors and having stored therein processor-readable instructions which, when executed by the one or more processors, may cause the one or more processors to receive, from a streaming media client via the Internet, a first request for the secure streaming media communication session linked with the particular user account. The one or more processors may establish, via the Internet, in response to the request for the secure streaming media communication session, the secure streaming media communication session between the private streaming media server via a previously-established outbound session initiated by the private streaming media server and the media relay server system. The one or more processors may establish, by the media relay server system, a Transmission Control Protocol (TCP) communication service between the media relay server system and the private streaming media server via the Internet. The one or more processors may map the streaming media client to the private streaming media server. The one or more processors may route, via the Internet, encrypted media packets from the private streaming media server to the streaming media client without the encrypted media packets being decrypted by the media relay server system.

Embodiments of such a system may include one or more of the following features: The first request for the secure streaming media communication session may request a Hypertext Transfer Protocol Secure (HTTPS) communication service. The encrypted media packets may be routed by the private streaming media server to the streaming media client as part of the HTTPS communication service. Mapping the streaming media client to the private streaming media server may include processor-readable instructions which, when executed, cause the one or more processors to assign a first port to the streaming media client. The one or more processors may assign a second port to the private streaming media server. The one or more processors may map the first port to the second port such that data packets received on the second port may be transmitted to the streaming media client. The streaming media client and the private streaming media server may be owned and operated by a same user linked with the particular user account. The system may include the streaming media client. The private streaming media server may reside within a first private network and the streaming media client may reside within a second private network distinct from the first private network. Routing the encrypted media packets from the private streaming media server to the streaming media client may include processor-readable instructions which, when executed, cause the one or more processors to receive, from the private streaming media server via the Internet, a plurality of encrypted streaming media packets that indicate a port of the media relay server system. The one or more processors may determine that the plurality of encrypted streaming media packets are mapped to the streaming media client at least partially based on the indicated port. The one or more processors may transmit the plurality of encrypted streaming media packets to the streaming media client. The media relay server system may not have decrypted any of the plurality of encrypted streaming media packets. The processor-readable instructions, when executed, may further cause the one or more processors to establish a resource name for the private streaming media server that includes at least the same first level domain and second level domain as the resource name of the media relay server system. The encrypted media packets may include video and audio data.

In some embodiments, a non-transitory processor-readable medium for a media relay server system is described. The system may include processor-readable instructions configured to cause one or more processors to receive, from a streaming media client via the Internet, a first request for the secure streaming media communication session linked with a particular user account. The one or more processors may establish, via the Internet, in response to the request for the secure streaming media communication session, the secure streaming media communication session between the private streaming media server via a previously-established outbound session initiated by the private streaming media server and the media relay server system. The one or more processors may establish, by the media relay server system, a Transmission Control Protocol (TCP) communication service between the media relay server system and the private streaming media server via the Internet. The one or more processors may map the streaming media client to a private streaming media server. The one or more processors may route, via the Internet, encrypted media packets from the private streaming media server to the streaming media client without the encrypted media packets being decrypted by the media relay server system.

Embodiments of such a system may include one or more of the following features: The first request for the secure streaming media communication session may request a Hypertext Transfer Protocol Secure (HTTPS) communication service. The encrypted media packets may be routed by the private streaming media server to the streaming media client as part of the HTTPS communication service. The processor-readable instructions configured to cause the one or more processors to map the streaming media client to the private streaming media server may include processor-readable instructions configured to cause the one or more processors to assign a first port to the streaming media client. The one or more processors may assign a second port to the private streaming media server. The one or more processors may map the first port to the second port such that data packets received on the second port may be retransmitted to the streaming media client. The processor-readable instructions configured to cause the one or more processors to map the streaming media client to the private streaming media server may include processor-readable instructions configured to cause the one or more processors to receive, from the private streaming media server via the Internet, a plurality of encrypted streaming media packets that indicate a port of the media relay server system. The one or more processors may determine that the plurality of encrypted streaming media packets are mapped to the streaming media client at least partially based on the indicated port. The one or more processors may transmit the plurality of encrypted streaming media packets to the streaming media client. The media relay server system may not have decrypted any of the plurality of encrypted streaming media packets.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
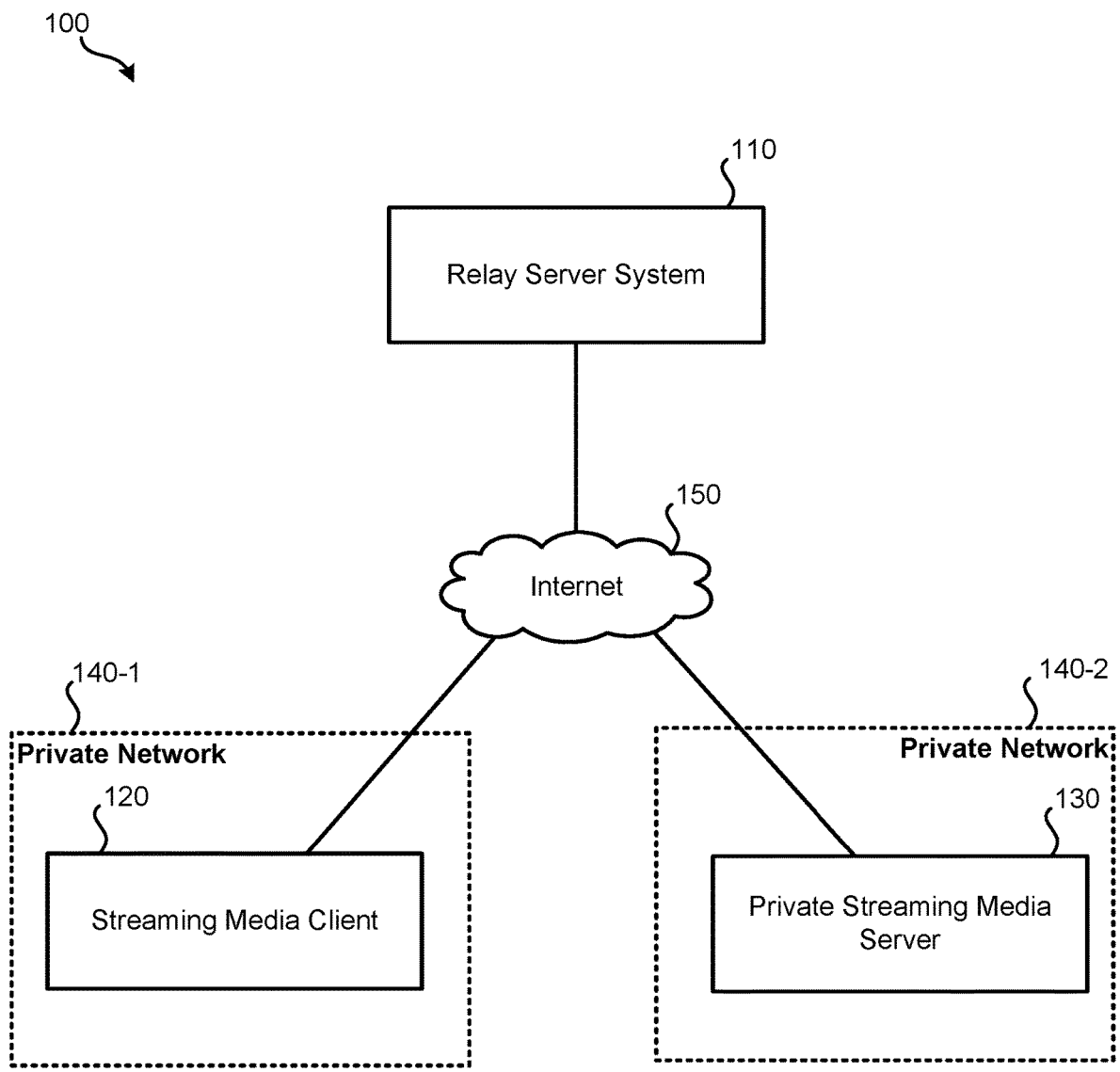
FIG. 1 illustrates an embodiment of a system for relaying a secure streaming communication session.

Stored or live video and/or audio content, which is referred to herein as media, may be streamed from a private streaming media server to a streaming media client. A streaming media client may be various forms of a computerized device, such as a smartphone, smart television, or tablet computer, that is capable of receiving video and/or audio content and outputting such content for viewing and/or listening. The private streaming media server may be a computerized device that is capable of receiving video and/or audio content and streaming this content to a streaming media client. Such a private media server may receive television programming, such as over-the-air (OTA) television programming, which may be recorded locally or streamed live to a streaming media client. For example, a Slingbox® made by Sling Media® is a type of private media server.

One possible challenge that may occur is when a streaming media client is to be used to output (e.g., playback) content from a private media server device when the streaming media client and the private media server device are connected with different private networks. A private network can be present when one or more devices are connected with a device that functions as a network address translator (NAT) gateway, such as a wired or wireless router, which creates a private local area network (LAN) and uses a private Internet Protocol (IP) address space. Such an arrangement obscures the IP addresses of devices functioning as part of the private LAN and can block incoming communication requests by functioning as a firewall. Rather, communication sessions may only be established in response to a device operating within the private network initiating an outbound communication request.

In some situations, the streaming media relayed between the private streaming media server and the streaming media client are to be encrypted. Such encryption may be performed for privacy, to comply with contractual agreements regarding transmission of the media (e.g., if the media is being distributed under license), and/or to prevent access by an unauthorized party. The amount of processing performed by a relay server that receives the streaming media from the private streaming media server and retransmits it to the streaming media client may be desired to be decreased or minimized. By decreasing such processing, the number of sessions that the relay server can handle simultaneously may be increased, thus decreasing the amount of hardware resources that need to be devoted to performing such relay functionality. Additionally or alternatively, it may be desired to minimize or decrease the latency of transmissions between the private streaming media server and the streaming media client. Decreasing such latency may improve the end-user experience by providing such media nearly "live" (meaning, close to the same time the media is initially broadcast via an over-the-air, cable, satellite, over-the-top (OTT) or some other television programming distribution network).

In order to allow streaming media to be encrypted while decreasing the processing workload and/or latency of data transmission caused by a relay server system, the relay server system may not decrypt and re-encrypt media prior to transmission to the streaming media client. Rather, a secure session may be established directly between the streaming media client and the private streaming media server through the relay server system. This arrangement may be effected at least in part by the private streaming media server being assigned a top level and second level domain that matches the relay server. This arrangement can allow a request for a secure communication session (e.g., hypertext transfer protocol secure (HTTPS)) transmitted to the relay server system to be validly rerouted or forwarded to the private streaming media server through the relay server system since the relay server and private streaming media server are part of the same domain. By the secure communication session being established directly between the private streaming media server and the streaming media client, the relay server system functions as an intermediary network routing device. Thus, the relay server can receive, readdress, and transmit encrypted media packets from the private streaming media server to the streaming media client without the encrypted media packets being decrypted by the relay server system. Therefore, the relay server system does not decrypt the streaming media, but rather relays encrypted packets. This arrangement can decrease the amount of processing performed by the relay server system and/or decrease the latency of streaming media being transmitted from the private streaming media server to the streaming media client while permitting the streaming media to be encrypted during transmission and allow the streaming media client and the private streaming media server to communicate while part of distinct private networks.

Further detail is provided in relation to the figures. FIG. 1 illustrates an embodiment of a system 100 for relaying a secure streaming media session. System 100 may include: relay server (RS) system 110; streaming media (SM) client 120; private streaming media (PSM) server 130; private networks 140 (140-1 and 140-2); and Internet 150. PSM server 130 may be a computerized device that receives television programming via one or more television distribution networks (e.g., cable, satellite, OTT, OTA), encodes the received video and audio, and stores and/or streams such encoded television programming to an SM client (which can be located locally as part of the same private network or remote and accessible via the Internet). PSM server 130 may also be called a television streaming media device. An example of a type of PSM server 130 may be a Slingbox® made by Sling Media®. PSM server 130 may be operated in association with a particular user account. That is, the media recorded and/or streamed live by PSM server 130 may only be permitted to be viewed by a particular user or users who have access to a particular user account linked with the entity operating RS system 110. PSM server 130 may be owned and operated by the particular user or users and may reside in a residence where the user receives television programming. PSM server 130 may be computerized device and, therefore, may include one or more processors, one or more non-transitory computer readable mediums (e.g., memories, hard drives, solid state drives), one or more communication buses, one or more wired and/or wireless network interfaces, or one or more input ports to receive television programming (e.g., an HDMI port, a coaxial antenna port, component inputs, optical input, etc.).

PSM server 130 can be part of private network 140-2. Private network 140-2 may serve as a barrier between the local trusted private network and the Internet. Private network 140-2 may only permit outgoing network traffic and may block incoming communication requests. Therefore, for a device, such as PSM server 130, to communicate with a device located outside of private network 140-2, an outgoing communication session may be required to be established by PSM server 130. An incoming request that is unassociated with a previously-established outbound communication session may be prohibited by a gateway device of private network 140-2. Such a gateway device may be a wired or wireless router, or some other form of access point (AP) that serves as an interface between a LAN and an internet service provider (ISP).

SM client 120 may be a computerized device that can output media for presentation. SM client 120 may directly output media for presentation, such as via an integrated speaker, integrated display screen, and/or integrated wired headphone jack or wireless headphone interface (e.g., a Bluetooth® interface). SM client 120 may be a computerized device and, therefore, also includes one or more processors, one or more non-transitory computer readable mediums (e.g., memories, hard drives, solid state drives), one or more communication buses, and one or more wired and/or wireless network interfaces. SM client 120 may be a smartphone, tablet computer, smart television, laptop computer, desktop computer, or gaming device. In some embodiments, SM client 120 is a device intended to be connected with a separate video and/or audio presentation device. For example, SM client 120 may not have an integrated display screen and/or integrated speaker, but rather may connect to another presentation device, such as a television for presenting received streaming media.

SM client 120 may function within private network 140-1. Private network 140-1 may function similarly to private network 140-2. Private network 140-1 may be separate and distinct from private network 140-2. For example, private network 140-1 may be located at a different residence within private network 140-2. Alternatively, private network 140-1 may be located in a location other than a residence. By SM client 120 and PSM server 130 being connected with Internet 150 via separate and distinct private networks 140, direct communication between SM client 120 and PSM server 130 may be difficult to establish due to both SM client 120 and PSM server 130 being required to establish communication sessions via outbound requests from within their respective private networks 140. In order to facilitate such communication, RS system 110 having a known location (e.g., a known uniform resource locator (URL)) may serve as an intermediary for communication between SM client 120 and PSM server 130. SM client 120 and PSM server 130 may communicate with RS system 110 via Internet 150. It should be understood that in some embodiments one or more additional private or public networks are included as part of the communication path between SM client 120 and RS system 110 and/or PSM server 130 and RS system 110.

RS system 110 may serve to relay communications between PSM server 130 and SM client 120. Such a relay of communications may include requests for media being routed from SM client 120 to PSM server 130 via RS system 110 and encrypted streaming media being routed from PSM server 130 to SM client 120 via RS system 110. In order for RS system 110 to be able to route a request for media (or some other form of message or communication) to PSM server 130, an outbound communication session from PSM server 130 may be required to be established with RS system 110. This requirement may be present due to PSM server 130 functioning as a part of private network 140-2, which blocks incoming communication requests. Therefore, PSM server 130 may maintain a persistent communication path with RS system 110 by periodically or occasionally establishing an outgoing communication session with RS system 110. By doing so, when RS system 110 has data to be transmitted as a message to PSM server 130, the message can be transmitted into private network 140-2 to PSM server 130 without being blocked by a firewall of private network 140-2. RS system 110 may be a group of one or more server systems that include one or more processors, one or more non-transitory computer readable mediums (e.g., memories, hard drives, solid state drives), one or more communication buses, and one or more wired and/or wireless network interfaces.

It should be understood that SM client 120 and PSM server 130 are typically owned by same user. A user may install and configure PSM server 130 at his residence to receive, record, and stream television programming. The user may then use SM client 120 at a remote location to be able to access the media recorded and streaming from PSM server 130. Therefore, while SM client 120 and PSM server 130 are functioning as part of distinct private networks, these devices can be owned and operated by the same user and, thus, a single username and password may be used to access PSM server 130.

Figure 2:
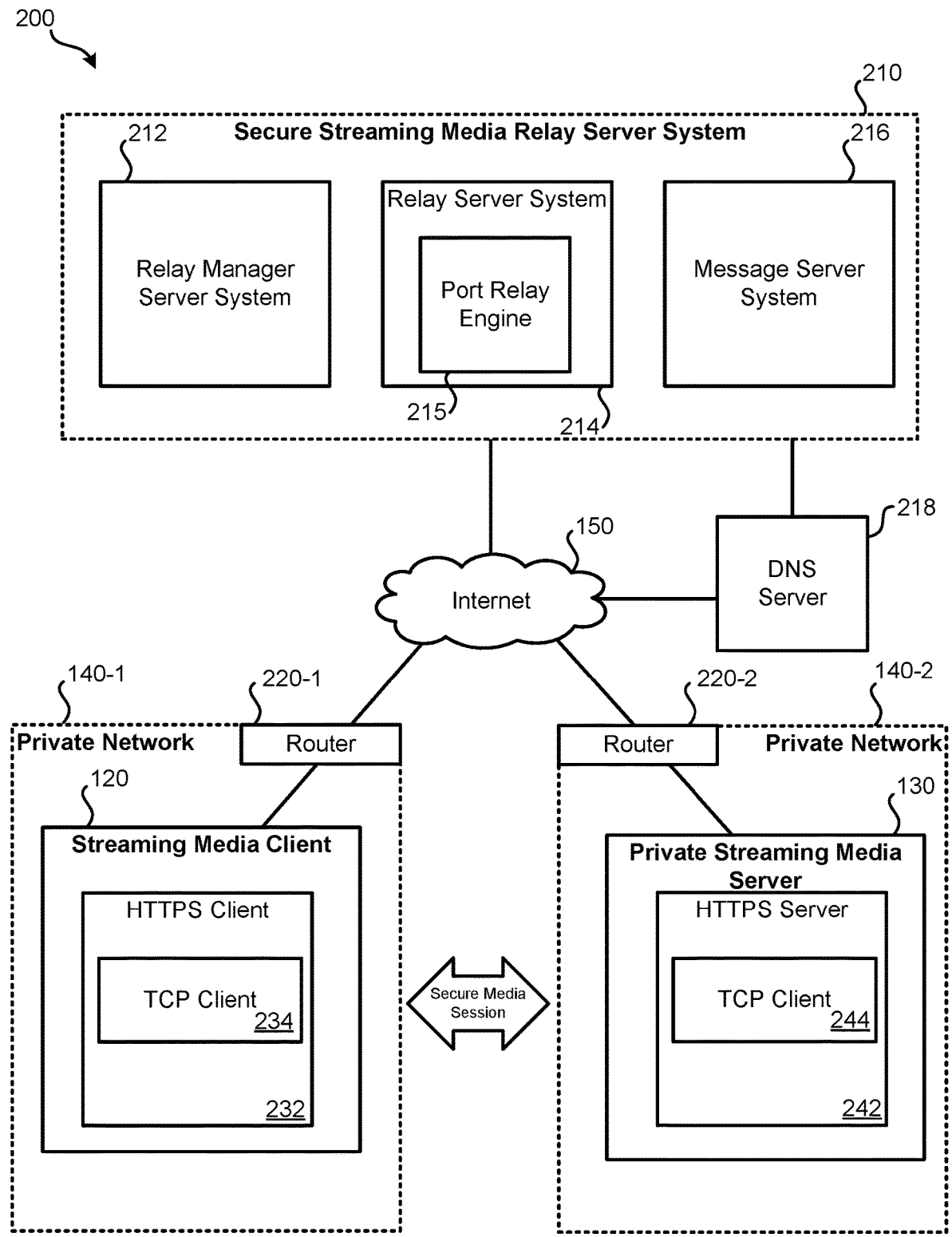
FIG. 2 illustrates another embodiment of a system for relaying a secure streaming communication session.

FIG. 2 illustrates an embodiment of a system 200 for relaying a secure streaming media session. System 200 can represent a more detailed embodiment of system 100 of FIG. 1. In system 200, secure streaming media relay server (SSMRS) system 210 is present. SSMRS system 210 can include relay manager server (RMS) system 212, relay server (RS) system 214, and message server (MS) system 216. SSMRS system 210 may include or communicate with domain name system (DNS) server 218. In some embodiments, RMS system 212, RS system 214, and MS system 216 are distinct servers or groups of servers that collectively function as SSMRS system 210. In some embodiments, the functionality of RMS system 212, RS system 214, and MS system 216 may be jointly executed by a server or group of servers. For example, a single server may function as RMS system 212 and MS system 216.

In system 200, private network 140-1 is created by router 220-1. Router 220-1 may be a wired or wireless router that communicates with Internet 150 via an ISP. Router 220-1 may communicate using some form of ISP interface, such as a cable modem, fiber optic modem, or digital subscriber line (DSL) modem. Router 220-1 may function as a gateway device that creates a firewall that prevents inbound communication requests from being established with SM client 120. Router 220-1 may permit outbound communication requests from SM client 120 to devices accessible via the Internet 150, such as RMS system 212. Similarly, router 220-2 may create private network 140-1. Private network 140-1 may function similarly to private network 140-2, such that outbound communication sessions from PSM server 130 is permitted, but inbound communication sessions are blocked.

A secure communication session, such as an HTTPS communication session, between PSM server 130 and SM client 120 may be established in order to permit media to be transmitted from PSM server 130 to SM client 120. This secure media session may be established such that packets of media encrypted by HTTPS server 242, executed by PSM server 130, are passed encrypted by RS system 214 to HTTPS client 232, which is executed by SM client 120. The encrypted data packets are passed from HTTPS server 242 to RS system 214. RS system 214, in turn, readdresses the encrypted packets (without decrypting the data within the encrypted packets) and transmits the encrypted stream media data packets to HTTPS client 232. As such, encrypted streaming media (that is not decrypted by SSMRS system 210) is passed from HTTPS server 242 to HTTPS client 232 via Internet 150 and RS system 214.

In order to establish the HTTPS communication session between SM client 120 and PSM server 130, since both devices are part of separate and distinct private networks, the secure communication session can be established through SSMRS system 210. Further, an HTTPS communication session may be required to be established via a DNS (rather than directly to a particular IP address). DNS server 218 may be in communication with SSMRS system 210 directly and/or through Internet 150. DNS server 218 may be incorporated as part of SSMRS system 210 in some embodiments. PSM server 130 may be assigned an address at DNS server 218 that is at least part of the same top level and second level domain as RS system 214. By having RS system 214 and PSM server 130 part of the same top and second level domain, the HTTPS session request from SM client 120 can be validly rerouted to PSM server 130. As an example, if RS system 214 has a top and second level domain of "streamingmediaserver.org," then PSM server 130 may be assigned a domain by DNS linked with SSMRS system 210 of "PSM_identifier.streamingmediaserver.org" by DNS server 218 in which "PSM_identifier" uniquely identifies PSM server 130 from other PSM servers that may be communicating with SSMRS system 210. For example, an IP address of PSM server 130 may be used as the PSM_identifier, or, for example, a unique assigned identifier may be used as PSM_identifier to avoid directly revealing the IP address.

A transmission control protocol (TCP) session may be established between PSM server 130 and RS system 214 for transmission of the encrypted streaming media data packets. A second TCP session may be established between RS system 214 and SM client 120. TCP client 244 ensures that delivery of media packets to RS system 214 is reliable, ordered, and error-checked. Similarly, a TCP session between RS system 214 and TCP client 234 may be established to deliver the rerouted encrypted streaming media data packets from RS system 214 to SM client 120 and TCP client 234. In some embodiments, HTTPS client 232 and TCP client 234 can be established by an Internet browser. In other embodiments, HTTPS client 232 and TCP client 234 may be established by a native application installed on and executed by SM client 120. HTTPS server 242 and TCP client 244 may be established by software and/or firmware installed on and executed by PSM server 130.

RMS system 212 may serve to receive requests from SM client 120. Such a request may indicate a request to access media from PSM server 130. The request may include username and password information and/or some other form of authentication data (e.g., fingerprint, PIN, etc.). For access to be permitted, the username and password (and/or other authentication data) may be required to be authenticated by RMS system 212 or some other server system that is functioning as part of SSMRS system 210. In response to a request from SM client 120, RMS system 212 may determine a port and IP address of RS system 214 to which SM client 120 should establish the HTTPS session.

MS system 216 may be informed by RMS system 212 of the connection request from SM client 120. MS system 216 may maintain a persistent connection with PSM server 130. PSM server 130 may periodically or occasionally initiate this outbound communication session such that the communication session is permitted by private network 140-1 and MS system 216 can transmit messages to PSM server 130. MS system 216 may provide PSM server 130 with an IP and port of RS system 214 to be used for relaying encrypted streaming media to SM client 120.

RS system 214 may perform the actual relaying of encrypted streaming media from TCP client 244 to TCP client 234. RS system 214 may include port relay engine 215. Port relay engine 215 may map particular ports to each other such that encrypted streaming media received on a first port is output to SM client 120 via a second port. Similarly, requests for media packets received via a particular port from SM client 120 are routed by RS system 214 and port relay engine 215 to PSM server 130. Port relay engine 215 may be executed by RS system 214 as software or firmware.

Figure 3:
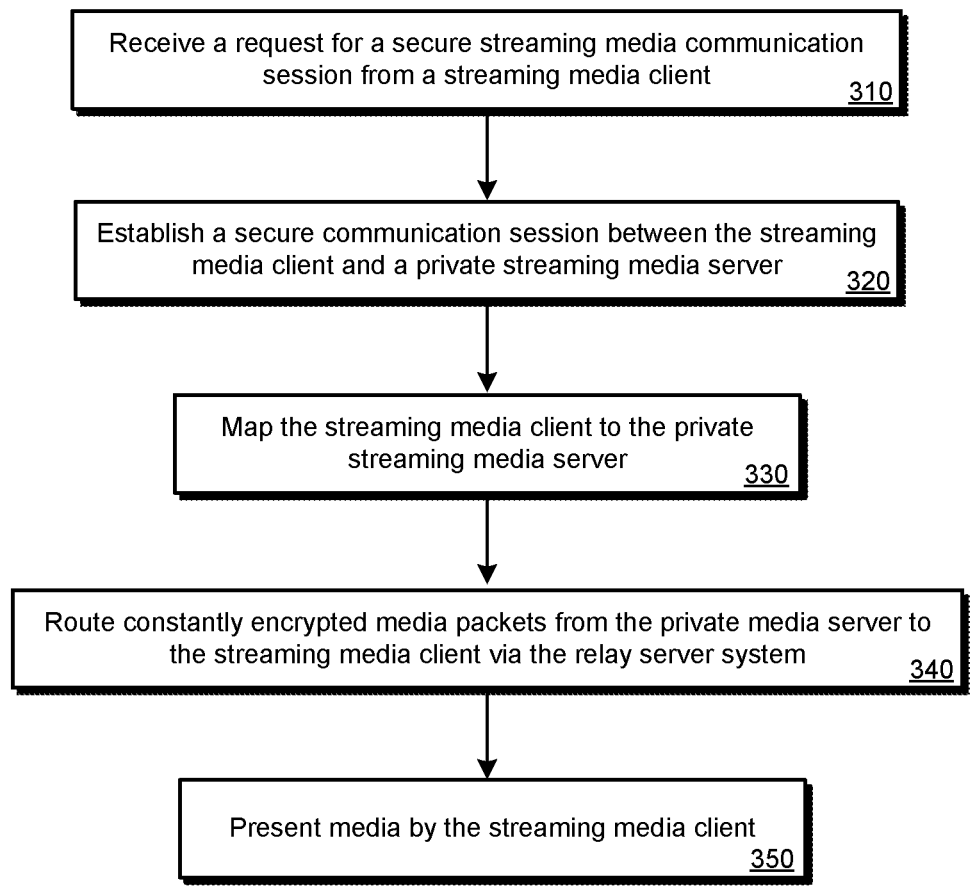
FIG. 3 illustrates an embodiment of a method for relaying a secure streaming communication session.

The systems of FIGS. 1 and 2 may be used to perform various blocks, steps, or methods. FIG. 3 illustrates an embodiment of a method 300 for relaying a secure streaming media communication session. Method 300 may be performed using system 100 or system 200 of FIG. 1 or 2, respectively. Each step of method 300 may be performed using an RS system (e.g., RS system 110) or more specifically, one or more components of an SSMRS system (e.g., SSMRS system 210). At block 310, a request for a secure streaming media communication session may be received by the RS system (or, more specifically, by the RMS system functioning as part of an SSMRS system) from an SM client. This request may be generated and transmitted in response to a user providing authentication information (e.g., a username and password) and this information being verified by the RMS system or a dedicated authentication server system.

At block 320, a secure communication session, such as an HTTPS session, may be established between a PSM server for which the username and password grants access and the SM client. The request from the SM client may be forwarded to the PSM server since both the PSM server and the relay server function are part of the same domain. That is, the PSM server was previously assigned an address within the domain of the relay server system. Therefore, while the HTTPS session is between the SM client and the PSM server, the HTTPS session is forwarded through the relay server.

At block 330, the RS system may map the SM client to the PSM server by assigning a first port to the SM client and a second port of the PSM server. Therefore, data (e.g., encrypted streaming media) received from the PSM server on the second port is forwarded to the SM client and data received from the SM client on the first port is forwarded to the PSM client. RS system 220 may maintain a routing database (or other storage arrangement) that maps particular ports to particular devices such that data received on a particular port can be determined to which device it should be transmitted.

At block 340, encrypted media packets of streaming media received from the PSM server are transmitted (routed or forwarded) to the SM client by the RS system. The RS system does not decrypt the streaming media but rather retransmits or forwards the encrypted streaming media. This arrangement helps reduce latency and save the RS system from having to allocate processing resources to perform a decryption and re-encryption prior to retransmission.

At block 350, the streaming media encrypted by the PSM server is decrypted by the SM client and output for presentation, either by the SM client itself or a presentation device in communication with the SM client.

Figure 4A:
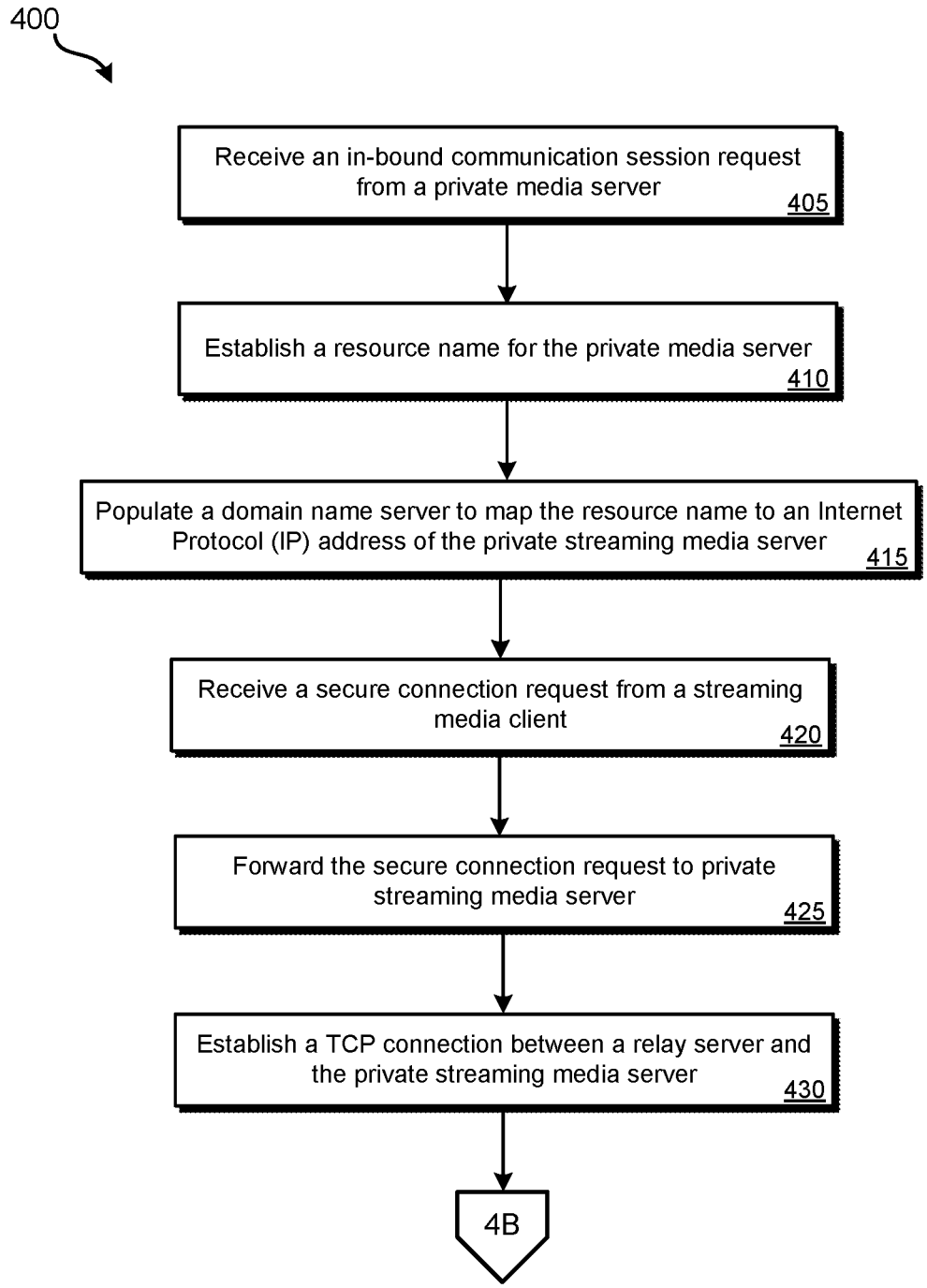
FIGS. 4A and 4B illustrate another embodiment of a method for relaying a secure streaming communication session.
Figure 4B:
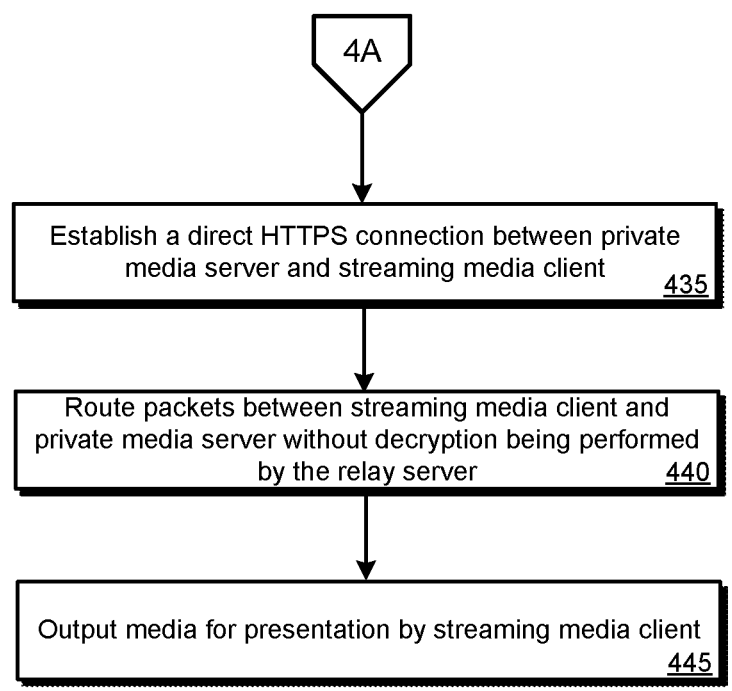

FIGS. 4A and 4B illustrate an embodiment of a method 400 for relaying a secure streaming communication session between different private networks. Method 400 can represent a more detailed embodiment of method 300. Method 400 may be performed using system 100 or system 200 of FIG. 1 or 2, respectively. Each step of method 400 may be performed using an RS system (e.g., RS system 110) or more specifically, one or more components of an SSMRS system (e.g., SSMRS system 210).

At block 405 of FIG. 4A, an outbound communication session request initiated by a PSM server may be received. This request may also indicate the particular username and password linked with the PSM server. This request may be received by an MS system functioning as part of an SSMRS system. By virtue of this communication session request (which was initiated as outbound from the PSM server), an open communication session may be maintained between the MS system and the PSM server. At block 410, a resource name for the PSM server may be established within a DNS such that the PSM server has a same first and second level domain name as a relay server functioning as part of the SSMRS system. Block 410 may be performed in response to block 405. The resource name established at block 410 may be unique from other resource names established within the DNS for other PSM servers. At block 415, using the resource name established at block 410, the DNS may be populated with the resource name such that the resource name maps to an IP address of the PSM server. The DNS server may be operated in association with or as part of the SSMRS system. For example, in response to a public DNS receiving a request for an address within a domain of the SSMRS system, the DNS server may be contacted to determine the specific IP address. This DNS server may, therefore, link the established resource name of block 410 with the PSM server for which the inbound communication session is maintained as open.

At block 420, a request to establish a connection with the PSM server may be received by the SSMRS system. This request may be received specifically by an RMS system functioning as part of the SSMRS system. HTTPS requests may be required to be passed through a DNS system. The request to establish the connection with the PSM server may be received from an SM client. The request may, specifically, be a request for a secure session (e.g., HTTPS) linked with a particular username and password. The RMS system may determine and respond to the SM client with an IP address and a port of an RS system that has been allocated for relaying of encrypted streaming media. The provided IP address, hostname, and port of the RS system may be used to establish the HTTPS connection with the PSM server. The hostname of the RS system can contain the same second and top level domain as that of the PSM server. For example, if the RS system has hostname of "relay.streamingmediaserver.org", the PSM server can have a hostname similar to "PSM_identifier.streamingmediaserver.org", in which "PSM_identifier" & "relay" are the leaf domain (or third-level domains) to uniquely address the RS system and the PSM server.

At block 425, the SM Client can initiate a HTTPS connection request using the hostname and the port provided by the RMS System. The DNS server can resolve the hostname to the IP address of the RS System. RSS system may forward the SSL, TLS or any HTTPS negotiation related data to the PSM server and the reverse communication path. A server wildcard certificate chain and an associated private key may be installed in the PSM server for the HTTPS initial negotiation and server authentication. This forwarding of the HTTPS request may be performed since the DNS server of block 415 has been populated with a resource locator that corresponds to the PSM server and is within the same second and top level domain of the RS system. The HTTPS request forwarded to the PSM server may specify the IP address and port (which may or may not differ from the port specified to the SM client) to which the PSM server is to connect with the RS system. The PSM server may connect with the IP address and port specified as part of the received request.

At block 430, a TCP connection may be established between the PSM server and the RS system. Similarly, a TCP connection may be established between the RS system and the SM client. Method 400 continues on FIG. 4B. At block 435, a direct HTTPS connection between the PSM server and the streaming media client, via the RS system, is established. The RS system functions only as a network routing device and does not decrypt the encrypted streaming media packets that are part of the HTTPS connection. Packets exchanged between the SM client and the RS system are forwarded by the RS system without any decryption of the packet contents being performed by the RS system to the SM client at block 440. At block 445, the SM client may decrypt and output for presentation the encrypted streaming media received via the TCP connection and HTTPS connection with the PSM server.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for relaying a secure streaming media communication session, the method comprising:
   receiving, by a media relay server system from a streaming media client via the Internet, a request for the secure streaming media communication session linked with a particular user account, wherein:
      the request for the secure streaming media communication session requests a Hypertext Transfer Protocol Secure (HTTPS) communication service such that encrypted media packets are routed from a private streaming media server to the streaming media client as part of the HTTPS communication service;

the private streaming media server resides within a first private network that blocks incoming communication requests; and the request originates outside of the first private network;

initiating, by the private streaming media server, an outbound communication session with the media relay server system; and after initiating the outbound communication session with the media relay server system, establishing, by the media relay server system via the Internet, in response to the request for the secure streaming media communication session, the secure streaming media communication session between the private streaming media server and the media relay server system, wherein:

the private streaming media server records and stores media for retrieval in association with the particular user account;

mapping, by the media relay server system, the streaming media client to the private streaming media server; and routing, by the media relay server system via the Internet, the encrypted media packets from the private streaming media server to the streaming media client without the encrypted media packets being decrypted by the media relay server system.

2. The method for relaying the secure streaming media communication session of claim 1, wherein routing the encrypted media packets comprises:

receiving, by the media relay server system from the private streaming media server via the Internet, the encrypted media packets that indicate a port of the media relay server system.

3. The method for relaying the secure streaming media communication session of claim 2, wherein routing the encrypted media packets comprises:

determining, by the media relay server system, that the encrypted media packets are mapped to the streaming media client at least partially based on the indicated port.

4. The method for relaying the secure streaming media communication session of claim 3, wherein routing the encrypted media packets comprises:

transmitting, by the media relay server system, the encrypted media packets to the streaming media client, wherein the media relay server system has not decrypted any of the encrypted media packets.

5. The method for relaying the secure streaming media communication session of claim 1, wherein establishing the secure streaming media communication session comprises establishing a Transmission Control Protocol (TCP) communication service between the media relay server system and the private streaming media server via the Internet.

6. The method for relaying the secure streaming media communication session of claim 1, wherein mapping the streaming media client to the private streaming media server comprises:

assigning a first port to the streaming media client;

assigning a second port to the private streaming media server; and mapping, at the media relay server system, the first port to the second port such that the encrypted media packets received on the second port are retransmitted to the streaming media client.

7. The method for relaying the secure streaming media communication session of claim 6, further comprising determining, by the media relay server system, that the encrypted media packets are mapped to the streaming media client at least partially based on the encrypted media packets indicating the second port.

8. The method for relaying the secure streaming media communication session of claim 1, further comprising transmitting, by the media relay server system, the encrypted media packets to the streaming media client, wherein the media relay server system has not decrypted any of the encrypted media packets.

9. The method for relaying the secure streaming media communication session of claim 1, further comprising:

establishing, by the media relay server system, a resource name for the private streaming media server that includes at least the same first level domain and second level domain as the resource name of the media relay server system.

10. The method for relaying the secure streaming media communication session of claim 1, wherein the private streaming media server and the media relay server system have a same first and second level domain.

11. The method for relaying the secure streaming media communication session of claim 1, wherein the streaming media client resides within a second private network that blocks incoming communication requests.

12. A system for relaying a secure streaming media communication session, the system comprising:

a media relay server system that communicates with a private streaming media server via the Internet, the media relay server system comprising:

one or more processors; and a memory communicatively coupled with and readable by the one or more processors and having stored therein processor-readable instructions which, when executed by the one or more processors, configured to cause the one or more processors to:

receive, from a streaming media client via the Internet, a first request for the secure streaming media communication session linked with a particular user account;

establish, in response to the first request for the secure streaming media communication session, the secure streaming media communication session between the private streaming media server via an outbound communication session previously initiated by the private streaming media server with the media relay server system, wherein:

the private streaming media server records and stores media for retrieval in association with the particular user account;

map the streaming media client to the private streaming media server; and route encrypted media packets from the private streaming media server to the streaming media client without the encrypted media packets being decrypted by the media relay server system; and the private streaming media server, wherein:

the private streaming media server records and stores media for retrieval in association with the particular user account;

the private streaming media server resides within a first private network that blocks incoming communication requests;

the first request originates outside of the first private network; and the private streaming media server initiates the outbound communication session with the media relay server system.

13. The system for relaying the secure streaming media communication session of claim 12, wherein the private streaming media server and the media relay server system have a same first and second level domain.

14. The system for relaying the secure streaming media communication session of claim 12, wherein the processor-readable instructions that cause the one or more processors to route the encrypted media packets comprises the processor-readable instructions being configured to cause the one or more processors to:

determine that the encrypted media packets are mapped to the streaming media client at least partially based on a port indicated by the encrypted media packets.

15. The system for relaying the secure streaming media communication session of claim 14, wherein the processor-readable instructions that cause the one or more processors to routing the encrypted media packets comprises the processor-readable instructions being configured to cause the one or more processors to:

transmit the encrypted media packets to the streaming media client, wherein the media relay server system has not decrypted any of the encrypted media packets.

16. The system for relaying the secure streaming media communication session of claim 12, wherein the processor-readable instructions that cause the one or more processors to establish the secure streaming media communication session comprises the processor-readable instructions being configured to cause the one or more processors to:

establish a Transmission Control Protocol (TCP) communication service between the media relay server system and the private streaming media server via the Internet.

17. The system for relaying the secure streaming media communication session of claim 12, wherein:

the first request for the secure streaming media communication session requests a Hypertext Transfer Protocol Secure (HTTPS) communication service; and the encrypted media packets are routed from the private streaming media server to the streaming media client as part of the HTTPS communication service.

18. The system for relaying the secure streaming media communication session of claim 12, wherein the processor-readable instructions that cause the one or more processors to map the streaming media client to the private streaming media server comprises the processor-readable instructions being configured to cause the one or more processors to:

assign a first port to the streaming media client;

assign a second port to the private streaming media server; and map the first port to the second port such that the encrypted media packets received on the second port are retransmitted to the streaming media client.

19. The system for relaying the secure streaming media communication session of claim 18, wherein the processor-readable instructions are further configured to cause the one or more processors to determine that the encrypted media packets are mapped to the streaming media client at least partially based on the second port.

20. The system for relaying the secure streaming media communication session of claim 12, wherein the streaming media client resides within a second private network that blocks incoming communication requests.

\* \* \* \* \*